Figure 1:
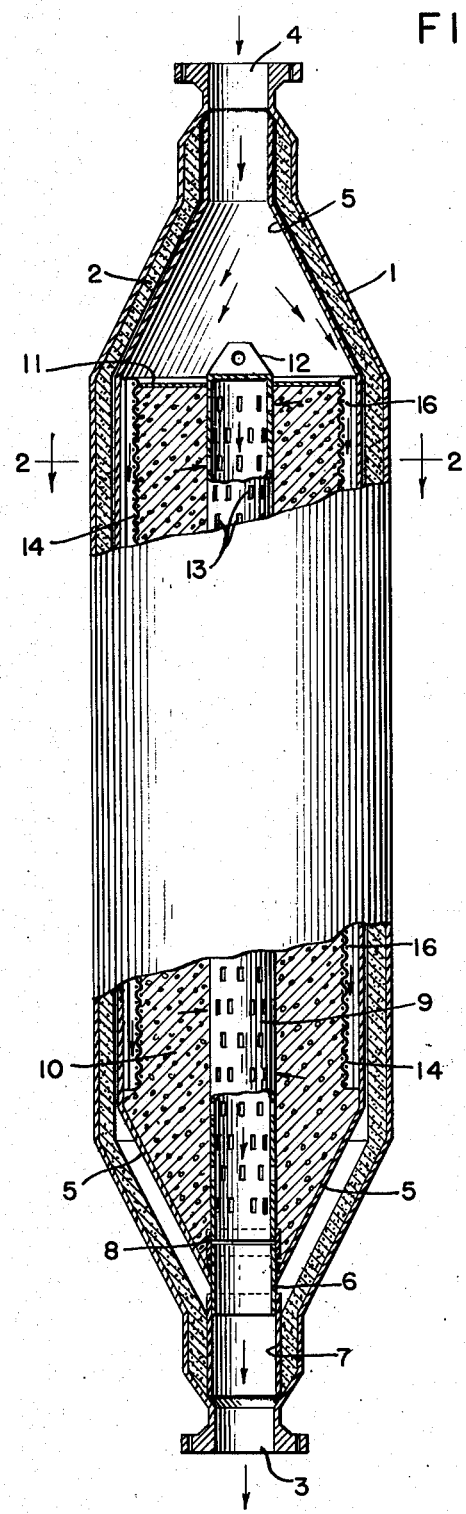

April 7, 1953 H. J. NEBECK 2,634,194
LINED REACTOR
Filed Oct. 31, 1951

INVENTOR:
HOWARD J. NEBECK
BY:
Chester J. Giuliani
Philip T. Liggett
ATTORNEYS:

Patented Apr. 7, 1953

2,634,194

UNITED STATES PATENT OFFICE 2,634,194

LINED REACTOR

Howard J. Nebeck, Berwyn, Ill., assignor to Universal Oil Products Company, Chicago, Ill., a corporation of Delaware Application October 31, 1951, Serial No. 254,127

4 Claims. (Cl. 23—288)

The present invention relates to an improved form of a lined reactor and more particularly to an internally insulated and lined reactor adapted to hold a fixed bed of subdivided catalyst or contacting material in a manner permitting radial flow of the reactant stream therethrough under high pressure and high temperature conditions.

There are various other types of fixed bed reactors which are used in high temperature service and are adapted to retain catalyst or other material for contacting a hydrocarbon fraction, or chemical reactant stream and for effecting conversion to a desired product. However, the usual reactor does not provide, as does the present improved form, both an internally lined and internally insulated chamber permitting radial flow of the reactant stream throughout the entire height of the particle bed, with a resulting low pressure drop and increased use of the catalyst or other contacting material so that a maximum quantity of the material is contacted by the reactant stream. Also the present reactor is of advantage over the usual type of a reactor in that it provides both an internal metal or metal alloy liner and internal insulating material so that it is adapted to accommodate any high temperature and high space velocity operation, as well as high temperature hydrogen containing streams.

It is to be noted that carbon steel at high temperature conditions, say about 500° F., is permeable to hydrogen and it is necessary to utilize a suitable metal alloy for a liner in the reaction chamber in order to retain the hydrogen. Further, where ordinary steel is subjected to the exposure of hydrogen for a long period of time, then less severe conditions of temperature and pressure may be critical and permit hydrogen attack and hydrogen permeation, as well as metal corrosion from slightly corrosive fluid streams as may be charged to, or formed within the reactor. A reactor embodying the construction and arrangement of the present invention may be used to particular advantage in catalytic hydrocarbon conversion operations such as dehydrogenation, reforming, hydroforming, hydrocracking, etc., where there is necessarily maintained a hydrogen atmosphere at high temperature and high pressure conditions.

One object of the present invention is to provide an internally insulated and internally lined reactor suitable for use in the conversion of a reactant stream in the presence of hydrogen under high temperature conditions.

Another object of the present invention is to provide a reactor for high temperature processing having a substantially single-piece liner which is supported at one end thereof and adapted to hold catalyst or other subdivided material therein for contacting a reactant stream.

Still another object of the present invention is to provide an internally lined and insulated reactor chamber having inlet and outlet means arranged to provide for the radial flow of the reactant stream through a catalyst bed, as well as means for readily removing the solid contacting material from the reactor chamber.

Briefly, the improved reactor of the present invention provides means for effecting contact between a reactant stream and a subdivided solid contacting material, and comprises in combination, an elongated outer chamber having an inlet opening or port at one end and an outlet opening or port at the opposite end thereof, an elongated open-ended liner supported within the outer chamber and having one end sealed to the interior of one end of the outer chamber, a tubular section extending into the outer chamber from the opening opposite that having the liner sealed therewith, and the interior end of the tubular section forming a slip-fit with the unsealed open end of the liner whereby the latter may expand and contract due to temperature changes, a refractory insulating material attached to the inside of the outer chamber and positioned around said liner in a manner providing for a slip-fit of the liner and a small annular space for the radial expansion thereof, and said refractory insulating material spaced a short distance from the unsealed end of the liner in a manner providing for the longitudinal expansion of the latter, a removable centrally positioned perforated fluid conduit means extending from the unsealed open end of the liner for substantially the full length of the interior thereof, longitudinal particle retaining screening positioned a short distance from the inside wall of the liner and forming with the liner an unobstructed fluid space, and said longitudinal screening forming a screened wall suitable for holding subdivided contact material in a bed between it and the centrally positioned fluid conduit means, whereby a reactant stream may flow radially through said contacting material and the resulting product stream may flow to the outlet opening of the reactor chamber.

In a preferred construction and arrangement the inner alloy liner connects to and hangs from an upper port wall of a vertically disposed reactor chamber such that the catalyst or contacting material which is retained within the liner is in effect suspended internally in the reactor chamber. Having the upper end of the liner connected to and sealed to the upper end of the outer vertical chamber also provides for the downward thermal expansion of the lower end of the liner within the insulated chamber, and permits the liner to move in the same direction as its normal deflection, caused by the weight of the liner and the contained catalyst.

The centrally positioned fluid conduit means may comprise one or more sections in a header arrangement, however, a preferred embodiment of the reactor also provides that a single perforate conduit or pipe be supported from the lower end of the liner in a slip-fit or seat arrangement such that it may be pulled vertically out of the top opening or port of the reactor chamber and permit catalyst particles to flow by gravity down through a lower open end of the inner liner and the lower open end of the reactor chamber. This pipe is thus constructed of a smaller diameter than the upper opening of the chamber in order to permit its withdrawal therefrom. The perforate pipe also has its upper and interior end closed so that the reactant stream passing thereto is entirely collected or distributed through a multiplicity of small perforations or slots spaced throughout the full length of the pipe and circumferentially around the pipe. This permits the reactant stream to flow evenly and laterally through the entire height of the bed of contacting material being maintained within the liner. The perforations or slots in the pipe are, of course, made of a smaller size than the catalyst or contacting particles retained in the chamber, so that they will not fall into the interior of the fluid pipe. The stream flow through the contact bed may be from the outside radially towards the pipe, or alternatively from the pipe radially outward to the space around the bed.

Still another feature of the present improved reactor is the use of a plurality of longitudinally curved strips of screening or a perforate material placed around the interior of the liner, to in turn form a fluid distributing or collecting space, or a plurality of spaces for the stream which passes radially through the contact bed from the wall of the liner to the perforate conduit or pipe, or from the latter to the liner wall, respectively. The screening or perforate members are spaced from the liner or are curved or arched in a manner to hold the solid contacting material away from the inner wall of the liner, and thus provide the desired space for passing the reactant stream adjacent the wall of the liner, without restrictions and any further pressure drop. The plurality of curved screening sections are preferably removably held in place at their edges by a plurality of vertical screen retaining strips which are spaced around the inside wall of the liner and welded or otherwise fixedly attached to the liner.

It may be noted, that the operating pressure within the liner will also be maintained between the outer shell and the liner, due to a pressure equilibrium taking place at the slip joint, between the liner and sleeve. However, there will be no actual flow of the reactant stream between the liner and the insulating material because of the seal made between the liner and the chamber at the upper end thereof. Further, since the liner does not accommodate a pressure differential, it may be made relatively thin, being only of such thickness as is necessary to carry its weight and the weight of the catalyst held therein.

Additional features and advantages of the present improved reactor will be apparent upon reference to the accompanying drawing and the following description relating thereto.

Figure 1 of the drawing is a sectional elevational drawing of one embodiment of the improved lined and insulated reactor.

Figure 2:
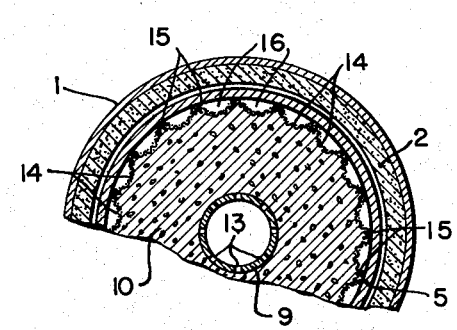

Figure 2 of the drawing is a sectional plan view through the reactor, as indicated by the line 2—2 in Figure 1 of the drawing.

Figure 3:
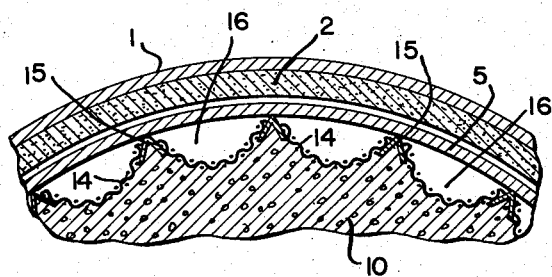

Figure 3 of the drawing is an enlarged sectional plan view of a portion of the reactor chamber and liner, indicating the positioning of the screening members adjacent the inside wall of the liner, to in turn provide either a fluid distributing zone or a collecting zone for the product stream.

Referring now to Figures 1 and 2 of the drawing, there is indicated a vertically positioned outer chamber or shell 1 having an inner layer of refractory insulation 2. This insulation may be an insulating type of concrete applied over rods, wire mesh, or the like, which in turn is welded or otherwise connected to the inside wall of the chamber 1. The upper and lower ends of the chamber 1 are also provided with suitable flanges in order that the reactor may be connected to inlet and outlet conduits in a processing unit. In one arrangement, a lower flanged opening or port 3 provides a product stream outlet from the interior reactor and an upper flange provides an inlet opening or port 4 for a reactant stream passing to the upper end of the reactor.

Suspended within the interior of the reactor chamber 1 and within insulation 2 is a metal liner 5, which in turn is adapted to retain particulated catalyst or contact material and accommodate the flow of the reactant stream which contacts the solid particles. The liner 5 is preferably welded to the upper end of the chamber 1 adjacent the lower end of the top flange 4 to provide both a supporting connection and pressuretight seal. This liner may also be provided of an alloy suitable to resist hydrogen attack, for as indicated hereinbefore, an improved reactor of the present design may well be used in a catalytic reforming operation, or a hydrocracking operation, where hydrogen is present at high temperature and high pressure, and ordinarily causes damage to unprotected carbon steel.

In the embodiment shown, the lower end of the liner 5 is tapered to conform with the tapered lower end of the reactor chamber 1; but the liner is spaced above the lower end of the chamber and above the refractory insulation 2 so that longitudinal expansion of the liner will be accommodated without touching the refractory material. A tubular expansion section or sleeve 6 is welded or is otherwise held in place within the lower position of the liner 5 to provide a passageway with the interior of the reactor liner. The lower end of the tubular member 6 is indicated as slidably fitting within a tubular section or sleeve 7, which in turn connects with and extends upwardly into the reactor chamber a short distance from the end of the flange and opening 3. The sliding fit between sleeves 6 and 7 permits the reactor liner 5 to expand from its upper fixed end downwardly in the lower end of the chamber under the high temperature operating conditions, while at the same time providing an axial guiding means for retaining the lower end of the liner in proper position.

The upper end of the sleeve 6 is provided with a circumscribing band member 8, which extends a short distance above the sleeve 6 and provides a shoulder or bell-joint suitable for supporting an elongated centrally positioned fluid conduit 9. This conduit 9 is provided with a multiplicity of perforations or small slots 13 throughout the entire length thereof in order that the reactant stream may be uniformly collected, or distributed if it is so desired throughout the entire length of the pipe. Preferably the reactant stream passes through the catalyst bed 10 in a lateral and essentially horizontal manner. The upper end of the conduit 9 is, of course, closed or sealed in order that the stream will not pass out the top thereof. The slots or perforations 13 in the pipe 9 are also small enough to prevent the passage of the particles of catalyst or other contact material which is held in an annular shaped packed bed surrounding the pipe. A solid or non perforate plate 11 covers the upper surface of the catalyst bed 10 and circumscribes the upper end of the pipe 9 in order that the latter is held in a substantially axial position within the reactor chamber. The plate 11 is, however, preferably unconnected to the pipe 9 so that the latter may be pulled vertically upwardly within the reactor chamber by way of the opening flange 4. A suitable bail or hole 12 in a plate is provided at the upper end of the conduit 9 for attaching a cable which may pull the pipe 9 upwardly and out of the support provided by the sleeve member 6 and ring 8 at the lower end of pipe 9.

It is a particular feature of the improved construction of this reactor to have the centrally positioned distributing conduit or pipe 9 removably supported at its lower end, in order to permit its being lifted and in turn allow the catalyst particles in bed 10 to flow by gravity downwardly through the sleeves 6 and 7 and out through the opening 3. Preferably catalyst particles are formed in small spheres or are pelleted in a relatively uniform size and shape that will not pack unduly, but will flow by gravity upon the removal or lifting of the pipe 9.

It is also a particular feature of the present improved reactor to provide a plurality of removable screening members 14 around and spaced from the inside periphery of the liner 5. The screening members 14 may be made of perforated sheet metal, wire cloth, or heavy screening material which is suitable to hold the catalyst particles away from the wall of the liner 5 and thus provide a fluid of vapor space around the inside wall of the liner, and in this instance provide for the continuous distribution and radial flow of the reactant stream to the bed 10. The stream passing through the screening members 14 to the catalyst bed flows laterally into conduit 9 and downwardly through the latter (as indicated by the arrows), through tubular section 7 and then out of the reactor through the lower outlet opening 3.

Reference to Figure 3 of the drawing indicates one embodiment for holding the plurality of removable screen members 14 in place and spaced from the liner 5. Each of the screening members 14 are elongated strips having a curved cross section so that they are long cylindrical segments. A plurality of V-shaped strips are welded or otherwise attached to the inner periphery of the liner 5 and spaced circumferentially around the liner to in turn provide retaining means holding the longitudinal and vertical edges of each of the screen members 14. Each of the latter is curved outwardly into the chamber in a convex or arched manner so that they readily hold the catalyst particles away from the inside wall of the liner 5. The edges of the screened members 14 are however, not fixedly attached to the V-shaped strips 15, so that they may be removably slid or sprung into place for either maintenance or replacement purposes.

Other suitable devices, however, may be used for removably holding screening means in position around the inside of the liner, and it is not intended to limit the improved construction of the present reactor to only the illustrated means of placing the screening members in place. For example, cylindrical segments or an entire cylindrical screening member may be spaced around and away from the inside wall of the liner 5 by means of suitable spacer strips between the screen and the wall of liner 5, and thus provide a suitable unrestricted annular passageway.

In the operation of the embodiment illustrated a reactant stream enters the upper end of the reactor chamber 1 through inlet 4, to in turn enter the plurality of spaces 16. From the latter, the stream passes radially inwardly and essentially in a horizontal direction through the entire height of the catalyst bed 10. The contacted stream then passes through the plurality of holes or slots 13 into the central pipe 9, and thence downwardly through the latter to the outlet opening 3. Thus, the reactant stream flows in a continuous substantially annular path downwardly around the catalyst bed 10 and adjacent the inside wall of the liner member 5 prior to passing into the bed 10. The reactor is however not limited to this flow, for as indicated hereinbefore, the flow may be from the central pipe outwardly radially through bed 10 to the annular zones 16.

It is to be noted, that the operating pressure of the reactant stream will build up in the zone between the liner 5 and the outer chamber 1, and within the refractory insulation 2, because of the nonpressure tight slip-joint between the lower end of the sleeve 6 and the upper end of sleeve 7. There is thus no need to design the liner 5 to accommodate superatmospheric pressures, but only to consider the structural requirements for the weight of the liner and the catalyst it supports. On the other hand, the outer chamber 1 must accommodate the superatmoshperic pressure at which the reactor will operate, but by reason of the insulation, the design strength of the chamber 1 may be based on the reduced temperature provided by the insulating material 2. It is to be further noted that while the reactant stream builds up a pressure between the alloy liner 5 and outer chamber 1, there is no continuous flow of the reactant stream or any other fluid in that zone because of the welded pressure tight connection between the upper end of the liner 5 and the upper end of the shell 1, from whence the liner is suspended. Thus, there is no erosion or channeling taking place in the insulating material 2, which might result in damage to the latter or to the chamber 1.

The present construction is thus particularly advantageous for reactors handling hydrogen-containing streams, which are harmful to ordinary steel chambers. Although hydrogen may enter the zone of the insulation 2, the hydrogen atmosphere reaching the inside wall of the outer chamber will be at a reduced temperature and will not harm the steel. A sufficient thickness in insulation is, of course, utilized to lower the temperature of the outer chamber 1 to a sufficiently low level that the steel of the outer chamber will not be attacked or unduly corroded. On the other hand, the liner 5 which may be subjected to contact with a hydrogen containing stream at high temperature and high pressure conditions, will be necessarily formed of a metal or an alloy which is resistant to hydrogen attack, as hereinbefore noted.

I claim as my invention:

1. A reactor for effecting contact between a reactant stream and subdivided solid contact material, which comprises in combination, an elongated outer chamber having an inlet opening at one end and an outlet opening at the opposite end thereof, an elongated open-ended liner supported within said outer chamber and having one end thereof sealed to one end of said chamber, a tubular section extending into said chamber from the opening opposite that which has said liner sealed therewith, and the interior end of said tubular section forming a slip-fit with the unsealed open-end of said liner whereby the latter may expand and contact in said chamber with temperature changes therein, a refractory insulating material attached to the inside of said outer chamber and positioned concentrically around said liner in a manner providing a small annular space for radial expansion and a slip-fit therewith, said refractory insulation spaced a short distance from the unsealed end of said liner and thereby providing for the longitudinal expansion of the latter within the insulated outer chamber, perforate fluid conduit means extending interiorly from one end of said liner for substantially the full length of the interior thereof, longitudinal particle retaining screening positioned a short distance from the inside wall of said liner and forming with the latter an unobstructed fluid space, and said longitudinal screening forming a screened wall suitable for holding subdivided contact material in a bed between it and said fluid conduit means, whereby a reactant stream may flow radially through said contact material, and a resulting product stream may flow to the outlet opening of said reactor chamber.

2. The reactor of claim 1 further characterized in that said longitudinal screening comprises a plurality of removable elongated curved segments positioned in a side by side relationship around the inner periphery of said liner and a plurality of spaced longitudinal screen-retaining strips are attached to the inside wall of said liner, whereby said plurality of screen segments may be slipped into place therebetween and removably held in said side-by-side relationship around the inside of said liner and provide said unobstructed fluid space.

3. A reactor adapted for contacting a reactant stream with subdivided solid contact material, which comprises in combination, an elongated vertically disposed outer chamber having a fluid port at the lower end thereof and a fluid port at the upper end thereof, an elongated metallic liner suspended within said outer chamber and having its upper end sealed to the interior of said chamber, with said liner having an upper port communicating with said upper chamber port, a lower tubular section extending a short distance upwardly into said reactor from said lower chamber port, a tubular expansion section connecting to and extending downwardly from the lower end of said liner providing a port thereto, said expansion section forming a slip-fit with said lower tubular section whereby said liner may expand and contract with temperature changes, a refractory insulating material attached to the inside of said outer chamber and positioned around said liner in a manner providing a slip-fit therewith, and said refractory insulating material spaced a short distance from the lower end of said liner in a manner providing for the longitudinal expansion of the latter from said upper end, a centrally positioned perforate fluid conduit supported by and extending vertically upward from said expansion section at the lower end of said liner, said fluid conduit extending for substantially the full length of said liner and having a closed upper end, longitudinal particle retaining screening positioned a short distance from the inside wall of said liner and forming with the liner a vertically unobstructed fluid space, said longitudinal screening forming a vertically screened wall suitable for holding contact material in a bed between it and said centrally positioned fluid conduit and thereby providing for the radial flow of the reactant stream through said contact material for the full height thereof.

4. The reactor of claim 3 further characterized in that said centrally positioned fluid conduit is of lesser diameter than said upper chamber port and is removably supported from said expansion section at the lower end of said liner, whereby said fluid conduit may be pulled from the interior of said liner, and contact material maintained within said liner may flow by gravity from the lower end thereof through said tubular sections and said lower fluid port.

HOWARD J. NEBECK.

No references cited.